United States Patent Office 2,775,577

Patented Dec. 25, 1956

1

2,775,577

CONTROLLED ISOBUTYLENE POLYMERIZATION

Helmuth G. Schneider, Westfield, and Paul W. Brakeley, Jr., Plainfield, N. J., assignors to Esso Research and Engineering Company, a corporation of Delaware No Drawing. Application December 23, 1952, Serial No. 327,664

5 Claims. (Cl. 260—82)

The present invention relates to an improved method for producing valuable polymers, and more specifically, to polymers of isobutylene.

Isobutylene can be polymerized to polymers of high molecular weight at low temperatures of 0° C. to −100° C. For such processes it is preferable to use polymerization catalysts, and among these, the active halide catalysts, such as boron fluoride and aluminum chloride, or other catalysts may be used, but sulfuric acid and active clay catalysts are also applicable.

The polymers produced in this way are quite different from the well known dimers and trimers of isobutylene and range from very viscous oils to plastic solid or semi-solid rubbery materials which are all freely soluble in hydrocarbon oils. Liquid products may be used alone as lubricating oils or they may be blended with natural oils, while the plastic solid or semi-solid polymers are of the greatest importance in thickening oils and simultaneously in raising their viscosity indices.

It has hitherto been supposed that the most advantageous method of making such polymers was to use isobutylene of the highest possible purity, and it was found that the degree of polymerization, that is to say, as represented by the viscosity or plasticity of the polymer, could be controlled by selection of the proper temperature at which the polymerization is brought about. Thus to make an oily polymer, only moderately low temperatures were required while to produce plastic solid polymers of progressively higher molecular weights, progressively lower temperatures were required.

Thus, polymers of various molecular weights and thickening powers can be produced which are suitable for blending agents with lubricating oils and other petroleum products. One advantage of these polymers is that while quite resistant to heat, they tend to depolymerize and leave no solid carbonaceous residues. In general, it is found that the higher the molecular weight of the product, the more readily it decomposes, and since at the same time, the higher molecular weight products have the greatest thickening power, it is particularly desirable to limit the molecular weight range of polymers avoiding excessively high and low polymers, and increasing the yield of fractions whose molecular weights do not greatly differ from the average.

The preparation of polymers from purified feed is necessarily expensive and attempts have been made to use cheaper feed stocks, such as a light cracked petroleum fraction consisting essentially of hydrocarbons having four carbon atoms and containing isobutylene. However, it has previously been necessary to fortify such a fraction with pure isobutylene in order to obtain polymers of desirable molecular weight, but this is expensive and is not commercially attractive.

It has now been found that the disadvantages of the prior art can be overcome and light cracked $C_4$ fractions can be used as feed stock for the preparation of low molecular weight polymers of isobutylene above 10,000 molecular weight, particularly in the 10,000 to 20,000 molecular weight range by treating the naphtha to remove all or almost all of the butene-2. This is predicated on the discovery that all n-butenes are not alike in their poisoning effect on the polymerization reaction, but that cis and trans butene-2 are far more drastic poisons than butene-1.

2

This application is a continuation-in-part of Serial No. 118,996, filed September 30, 1949, now U. S. Patent 2,637,720, issued May 5, 1953.

According to this invention, therefore, oil cracked for gasoline production is stabilized by rectification and a cut is produced known as the $C_4$ cut. This consists of butanes and butylenes with minor quantities of propane, proylene, pentane and amylene. This cut ordinarily contains from 10 to 20% isobutylene.

This $C_4$ cut is subjected to treatment to remove most of the butene-2 while leaving isobutylene and the lesser poison, butene-1. A suitable means for accomplishing this separation is fractionation. However, any other suitable means may be employed, such as extractive distillation, solvent extraction, and isomerization.

A refinery $C_4$ naphtha normally contains an isobutylene:butene-1:butene-2 ratio of approximately 1:1:1, or in terms of isobutylene to n-olefins, a ratio of 1:2. It has been shown that a polyisobutylene of 10,000–20,000 molecular weight cannot be made with such a feed, and that to effect polymerization, the n-olefin content must be held substantially below that of isobutylene. It had not been recognized up to this time that butene-2 is a far greater poison than butene-1. Hence, by removing some of the butene-2 from the polymerization feed, it is possible to obtain a 10,000–20,000 molecular weight product with a feed in which the isobutylene to n-olefin ratio can be raised to at least 1:1. Under these conditions, the butene-2 content, based on total n-butenes present, should not be over 20%.

When fractionation is employed as the method of removing butene-2, the fractionation is preferably carried out so as to obtain an overhead containing 15 to 30% of isobutylene, 15 to 28% butene-1, and not over 6% of butene-2, the balance being made up of saturated hydrocarbons. By carrying out the fractionation so that 50–80% of the fraction is taken overhead as distillate, no difficulty is encountered in preparing a 10,000–20,000 molecular weight product from the distillate so obtained as overhead.

The overhead fraction is then subjected to polymerization at temperatures ranging from 0° C. to −150° C. or lower, in the presence of active halide catalysts, such as boron fluoride and aluminum chloride.

The polymers may be added to lubricating oils and other products, for example, in proportion of .1 to 5% or more and thereby effect a substantial thickening of the oil, or, in other words, increase in viscosity. They also produce at the same time an increase in viscosity index of the oil and are highly desirable for that reason. Stability can best be illustrated by loss in viscosity under severe working conditions; for example, the polymer blend in oil may be circulated through a small orifice under high pressure and the relative decreases in viscosity measure the relative stabilities of the different polymers.

The following examples will serve to illustrate the invention although it is not intended to limit the invention thereto. All molecular weights are Staudinger molecular weight.

*Example I*

In order to illustrate generally the effect of the addition of pure isobutylene to a $C_4$ naphtha, various mixtures of highly purified isobutylene and $C_4$ naphtha were polymerized at −78° C., using boron fluoride as the catalyst and liquid ethane as the internal refrigerant. The following data were obtained:

TABLE I

[Polymerization of $C_4$ naphtha—isobutylene mixtures with $BF_3$ using ethane as an internal refrigerant.]

| Feed Composition [1] | | |
|---|---|---|
| $C_4$ Naphtha cut | Pure Isobutylene | Polymer, Molecular Wt. |
| 0 | 100 | 61,160 |
| 50 | 50 | 32,080 |
| 60 | 40 | 29,750 |
| 80 | 20 | 20,500 |
| 90 | 10 | 10,150 |
| 100 | 0 | 5,495 |

[1] Volume percent.

*Example II*

To show the relative poisoning effects of butene-1 and butene-2 on the quality of the polymer, pure isobutylene containing various amounts of butene-1, and butene-2, were polymerized with boron fluoride using solid carbon dioxide as the internal refrigerant. The following results were obtained:

TABLE II

[Poisoning effect of butene-1 and butene-2 on the polymerization o isobutylene, $BF_3$ catalyst, and $CO_2$ refrigerant internally.]

| Feed Composition | Polymer Molecular Weight | |
|---|---|---|
| Pure Isobutylene | 88,730 | |
| | Butene-1 | Butene-2 |
| Pure Isobutylene+0.001 n-olefins | | 83,830 |
| Pure Isobutylene+0.01 n-olefins | 84,000 | 79,000 |
| Pure Isobutylene+0.05 n-olefins | 81,700 | |
| Pure Isobutylene+0.1 n-olefins | 78,500 | 73,500 |
| Pure Isobutylene+0.5 n-olefins | 81,000 | 70,000 |
| Pure Isobutylene+1.0 n-olefins | 80,500 | 68,000 |
| Pure Isobutylene+2.5 n-olefins | 78,060 | 54,000 |
| Pure Isobutylene+5.0 n-olefins | 72,450 | 48,500 |
| Pure Isobutylene+10.0 n-olefins | 62,850 | 32,000 |

The above data show clearly that butene-2 is a much more severe poison than butane-1 in their relative effects on the polymerization of isobutylene.

*Example III*

To show the effect of fractionation of a $C_4$ naphtha on the molecular weight of the polymerized overhead, the naphtha was fractionated so as to take overhead from 50–90% of the cut. The original naphtha and each of these cuts were then polymerized with boron fluoride catalyst using solid carbon dioxide as the internal refrigerant. The data are set forth below in Table III.

TABLE III

[$C_4$ naphtha fractionation.—Effect of vol. percent overhead on distillate composition and polymers produced with $BF_3$ catalyst and $CO_2$ refrigerant.]

| Overhead on Fract [1] | Composition of Distillate [1] | | | | | Polymer, Molecular Weight |
|---|---|---|---|---|---|---|
| | Isobutylene | N-Butane | Isobutane | Butene-1 | Butene-2 | |
| 100 | 14.8 | 28.1 | 26.6 | 12.3 | 17.2 | 5,500 |
| 90 | 16.0 | 28.2 | 28.3 | 13.4 | 14.3 | 7,110 |
| 80 | 17.9 | 23.7 | 33.4 | 16.4 | 6.9 | 8,550 |
| 70 | 20.0 | 22.0 | 36.2 | 17.8 | 4.1 | 9,200 |
| 60 | 21.2 | 11.3 | 42.9 | 18.4 | 1.2 | |
| 50 | 24.6 | 10.7 | 49.9 | 22.7 | 1.0 | 13,720 |

[1] Volume percent.

*Example IV*

A series of runs was carried out to show the effect of the isobutylene to total n-butene ratio and the striking effect of n-butene concentration in the n-butene fraction reducing the polymer molecular weight. Boron fluoride was used as the catalyst and a carbon dioxide refrigerant was employed. The data are shown in Table IV below.

TABLE IV

[Polymerization of synthetic $C_4$ naphthas.]

| Composition of Synthetic $C_4$ Blends | | | | Ratio of Isobutylene To N-Butenes | Butene-2 in Total N-Butenes [1] | Polymer Molecular Weight |
|---|---|---|---|---|---|---|
| Isobutylene | Butene-1 | Butene-2 | N-Butane | | | |
| 20 | 18 | 2 | 60 | 1:1 | 10 | 15,500 |
| 20 | 16 | 4 | 60 | 1:1 | 20 | 13,300 |
| 20 | 14 | 6 | 60 | 1:1 | 30 | 9,550 |
| 10 | 16 | 4 | 70 | 1:2 | 20 | 9,600 |
| 20 | 16 | 4 | 60 | 1:1 | 20 | 13,300 |
| 40 | 16 | 4 | 40 | 2:1 | 20 | 20,000 |
| [2] 14.8 | 12.3 | 17.2 | [3] 54.7 | 1:2 | 58.3 | 5,500 |

[1] Volume percent.
[2] 100% overhead cut.
[3] Includes n-butane and isobutane.

What is claimed is:

1. A method for preparing isobutylene polymers having a molecular weight between 10,000 and 20,000 which comprises fractionating a light cracked petroleum fraction consisting of hydrocarbons having four carbon atoms in the molecule and containing isobutylene together with substantial amounts of butene-1 and butene-2, to remove sufficient butene-2 such that the ratio of isobutylene to n-olefins is not substantially less than 1:1 and the butene-2 content of the resulting product is not more than 20 volume percent of the total n-butene content and polymerizing the said treated petroleum fraction at a temperature below 0° C. in the presence of a metal halide catalyst chosen from the group consisting of boron fluoride and aluminum chloride.

2. A method according to that of claim 1 in which the treatment to remove the butene-2 comprises fractionating the mixture to remove 50–90% of the fraction overhead and using the said overhead fraction for the polymerization.

3. A method according to that of claim 1 wherein the metal halide catalyst is boron fluoride.

4. A method for preparing low molecular weight isobutylene polymers having a molecular weight range between 10,000 and 20,000, which comprises fractionating a light cracked petroleum fraction consisting essentially of hydrocarbons having four carbon atoms and containing isobutylene and substantial amounts of butene-1 and butene-2, separating as a naphtha overhead from said fractionation about 50–90% of the total fraction, said naphtha overhead having a reduced butene-2 content from that of the original petroleum fraction, having an amount of total n-butenes no greater than an amount approximately equal to the amount of isobutylene present, and having a butene-2 content no greater than 20% of the total n-butene content, and polymerizing the said resulting separated overhead naphtha with boron fluoride at a temperature below 0° C.

5. A method for preparing low molecular weight isobutylene polymers having a molecular weight range between 10,000 and 20,000, which comprises fractionating a light cracked petroleum fraction consisting essentially of hydrocarbons having four carbon atoms and containing isobutylene and substantial amounts of butene-1 and butene-2, said petroleum fraction containing about twice as much total n-butenes as isobutylene, separating as a naphtha overhead from said fractionation about 50–90% of the total fraction, said naphtha overhead having a reduced butene-2 content from that of the original petroleum fraction, adjusting the ratio of total n-butenes to isobutylene so that the total n-butenes is no greater than an amount approximately equal to the amount of isobuylene present, and said fraction having a butene-2 content no greater than 20% of the total n-butenes content, polymerizing the said resulting separated overhead naphtha with boron fluoride at a temperature below 0° C. and carrying out said polymerization under carbon dioxide refrigeration conditions.

References Cited in the file of this patent

UNITED STATES PATENTS

| | | |
|---|---|---|
| 2,219,867 | Gay | Oct. 29, 1940 |
| 2,296,399 | Otto | Sept. 22, 1942 |
| 2,637,720 | Schneider et al. | May 5, 1953 |
| 2,657,246 | Schneider et al. | Oct. 27, 1953 |

OTHER REFERENCES

Berkman et al.: Catalysis, page 910 (1 page only), 1940, published by Reinhold Pub. Corp., New York.